United States Patent [19]

Ichihara

[11] 4,013,305
[45] Mar. 22, 1977

[54] BUFFERING AIR-BAG MEANS

[75] Inventor: Isao Ichihara, Toyota, Japan

[73] Assignee: Toyota Jidosha Kogyo Kabushiki Kaisha, Toyota, Japan

[22] Filed: Apr. 21, 1975

[21] Appl. No.: 569,934

[30] Foreign Application Priority Data

May 15, 1974 Japan .............................. 49-54231

[52] U.S. Cl. .................................. 280/742; 222/3; 280/731; 280/740
[51] Int. Cl.² ....................................... B60R 21/08
[58] Field of Search ...................... 222/3; 141/317; 280/87 C, 736, 740, 742, 731

[56] References Cited

UNITED STATES PATENTS

| | | | |
|---|---|---|---|
| 3,527,472 | 9/1970 | Chute | 280/150 AB |
| 3,618,981 | 11/1971 | Leising | 280/150 AB |
| 3,692,495 | 9/1972 | Schneiter | 280/150 AB |
| 3,819,205 | 6/1974 | Dunford | 280/150 AB |
| 3,822,895 | 7/1974 | Ochiai | 222/3 X |
| 3,827,715 | 8/1974 | Lynch | 280/87 C X |
| 3,836,169 | 9/1974 | Schiesterl | 280/150 AB |
| 3,871,684 | 3/1975 | Staudacher | 280/150 AB |
| 3,901,530 | 8/1975 | Radke | 280/150 AB |
| 3,904,221 | 9/1975 | Shiki | 280/736 |

Primary Examiner—Joseph F. Peters
Assistant Examiner—John P. Silverstrim
Attorney, Agent, or Firm—Birch, Stewart, Kolasch and Birch

[57] ABSTRACT

A buffering air-bag means adapted to inflate a normally folded air-bag on the occasion of a collision by the generation of gas by a box-like gas generating means having gas ejecting openings formed in a substantially flat end, wherein a gas deflecting plate is provided to traverse the front of the gas ejecting openings in a manner to control the composite reaction force exerted by the gas jets ejected from the gas generating means so that the force properly balances by itself to relieve a steering column from compression.

2 Claims, 5 Drawing Figures

BUFFERING AIR-BAG MEANS

BACKGROUND OF THE INVENTION

1. Field of the Invention

The present invention relates to a buffering air-bag means and, more particularly, a buffering air-bag means which comprises a gas generating means mounted at a front face portion of the hub of a steering wheel and an air-bag which is normally folded around said gas generating means and is adapted to be inflated by the gas generated by said gas generating means to occupy a space in front of said steering wheel so as to provide a buffering body for the driver when a collision which produces a shock exceeding a predetermined level has occurred.

2. Description of the Prior Art

Since the air-bag means of the abovementioned type is mounted at the front face portion of a steering wheel hub, it must be constructed as small and compact as possible so that its mass or inertia does not affect the driving performance of the automobile and it does not disturb the driver in operating the steering wheel or observing various gauges mounted in the dash board. The volume of the air-bag means in its unactuated condition wherein the air-bag is folded, is determined principally by the volume of the gas generating means. The volume of the gas generating means or the volume of a box which forms an outer shell thereof is determined not only by the volume required for loading gas generating chemical substances, additives and a filter for cinders generated by the reaction of the chemical substances but also by the condition regarding the gas ejecting openings. When a collision has occurred, gas is ejected from the gas generating means at a high ejecting speed to rapidly inflate the air-bag. If the gas jet has a velocity component in the direction of the axis of the steering column, the column is exerted with a compression force in its axial direction. This compression force reduces the shock absorbing capacity of a steering column of a shock energy absorbing type, thereby damaging the buffering performance of the steering column. Therefore, in the conventional gas generating means, the box which forms the outer shell of the gas generating means is generally formed as a cylindrical body having closed opposite ends, while its cylindrical side wall is formed with gas ejecting openings so that the gas is ejected only in radial directions which are substantially perpendicular to the axis of the steering column.

Furthermore, in the conventional gas generating means, there is another problem in that the gas ejecting velocity can not be increased beyond a limit in view of cinder ejection, because if the gas ejecting velocity is very high, hot cinder particles ejected together with the gas impinge upon the wall of the air-bag thereby causing damage to the air-bag. Therefore, if a determined inflation performance of the air-bag is to be obtained under a limited gas ejecting velocity, the opening area of the gas ejecting openings must be increased, thereby causing a relatively large volume of the gas generating means.

An example of the conventional buffering air-bag means and the outer shell box of its gas generating means are shown in FIGS. 1 and 2, respectively. As shown in these figures, a gas generating means 1 is formed as a cylindrical body composed of a disc-like end wall 2, a cylindrical side wall 3 and an end wall 4 which closes the opposite end of the cylindrical body while providing a flange of mounting the gas generating means. The cylindrical side wall 3 alone is formed with a number of gas ejecting openings 5. In this box structure of the gas generating means, since the end wall 2 is not formed with gas ejecting openings, the cylindrical side wall 3 must have a relatively large height in order that the gas ejecting openings of a sufficient opening area are provided in the cylindrical side wall 3. When the gas generating means is mounted at a hub portion 7 of the steering wheel 6 together with an air-bag 8 mounted therearound and folded as shown in FIG. 1, the folded portion of the air-bag is generally arranged at side portions of the cylindrical gas generating means to avoid a further increase in the height of the air-bag means. In FIG. 1, element 9 designates a pad which encloses the folded air-bag.

As apparent from FIG. 1, the conventional air-bag means has the drawback that the height and diameter of the air-bag means in its stored condition covered by the pad 9 are relatively large and, therefore, the height $h$ of a steering wheel of a cone type must be increased, resulting in a large steering wheel. The big air-bag means prevents the driver from having a good view of various gauges mounted into the dashboard, thus affecting the drivability of the automobile.

The outer shell box is conveniently made by joining two cup members each being produced by the art of deep pressing. In this case, the gas ejecting openings can not be formed in a plate material before the application of deep pressing, because the plate material is much deformed by the deep pressing, thus making it almost impossible to obtain a final opening of a required shape and dimension from a preformed opening. Therefore said cup member is first produced from a blank plate and, thereafter, the gas ejecting openings are formed by drilling in the cylindrical side wall of the cup member. However, it requires substantial work and cost to form a number of radial openings in a cylindrical wall by drilling. Furthermore, it is difficult and inefficient to fold the air-bag 8 around the cylindrical gas generating means which further increases the manufacturing cost.

SUMMARY OF THE INVENTION

Therefore, it is the object of the present invention to solve the aforementioned problems existing in conventional air-bag means and to provide an improved air-bag means which is smaller and reduces the entire dimension of the steering wheel to which the air-bag means is mounted, thus providing a good view of the dashboard for the driver and having the further advantage that the air-bag can be mounted and folded more easily.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

According to the present invention, the abovementioned object is accomplished by a buffering air-bag means comprising a gas generating means mounted at a front face portion of a hub of a steering wheel and an air-bag which is normally folded around said gas generating means and adapted to be inflated by gas generaged by said gas generating means to occupy a space in front of said steering wheel, characterized in that said gas generating means comprises an outer shell box having a substantially flat end wall formed with a plurality of gas ejecting openings and a deflecting plate supported by said box to traverse the front of said gas ejecting openings and deflect gas jets ejected therefrom in the manner to generate a reaction force which counteracts the reaction force exerted to said box by said gas jets.

By utilizing a deflecting plate, the box may be formed with the gas ejecting opening oriented in the axial direction of the steering column allowing for an efficient simultaneous boring of a plurality of gas ejecting openings by the drilling technique employing a multidrill head or by the punching technique. In this case, if required, the entire surface of the box can be effectively utilized as a gas ejecting surface, whereby the volume of the box can be further reduced. By properly designing the deflecting plate, it can generate a reaction force which counteracts the reaction force exerted to said box by said gas jets in various degree so that the steering column is partially or completely relieved from the reaction force exerted by said gas jets. Thus, the shock absorbing capacity of the steering column of the shock absorbing type is substantially or completely preserved. The deflecting plate also serves to effectively catch the cinder particles.

According to a particular feature of the present invention, the outer shell box may have a relatively short cylindrical body with the bottom end thereof closed by a solid plate and the upper end closed by a perforated plate which contains said gas ejecting openings. In this case, said upper perforated plate may be substantially flat and said deflecting plate may also be a substantially flat disc. However, if required, the disc may have a downwardly curved peripheral edge.

The cylindrical box may be formed of two cup members engaged with each other to enclose an open end of each other, a bottom portion of one of said cup members being formed with said gas ejecting openings.

In the aforementioned box structure, the height of the cylindrical box or the length thereof in the direction of its axis is made relatively short, permitting the air-bag to be folded above the upper wall of the box, whereby the folding and mounting of the air-bag are facilitated.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 3:
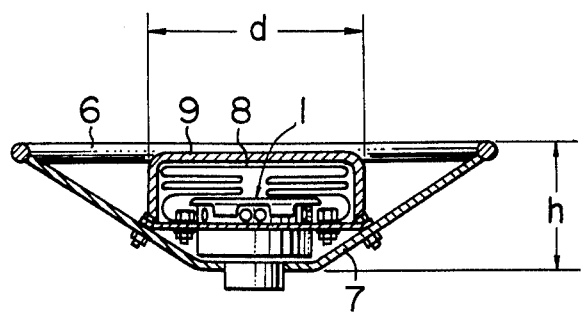
FIG. 3 is a schematic sectional view showing an embodiment of the air-bag means according to the present invention mounted to a steering wheel.

FIG. 3 shows an embodiment of the air-bag means according to the present invention which is mounted at a front end portion of a steering wheel hub. The illustration is made in a similar manner as in FIG. 1, with the same reference numerals representing corresponding elements.

Figure 4:
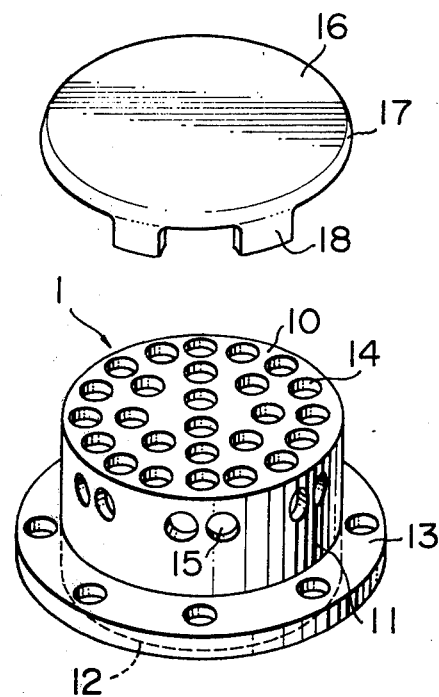
FIG. 4 is a perspective view showing a gas generating means incorporated in the air-bag means shown in FIG. 3, with a part thereof being disassembled for the purpose of illustration; and, FIG. 5 is a sectional view to explain the operation of the air-bag means according to this invention.

FIG. 4 shows a detailed structure of the gas generating means 1 incorporated in the air-bag means shown in FIG. 3, with a portion thereof being disassembled. In this embodiment the gas generating means 1 is formed as a cylindrical box composed of a flat end portion 10, a relatively short cylindrical portion 11 and another flat end portion 12 which closes a bottom end of said cylindrical portion. A flange 13 is mounted to an intermediate portion of the cylindrical portion. The flat end portion 10 is formed with a plurality of gas ejecting openings 14. The cylindrical portion 11 may also be formed with several gas ejectings openings 15, as in the shown embodiment. Element 16 designates a deflecting plate which is mounted to an upper end portion of the box structure of the gas generating means to traverse the front of the flat end portion 10 while leaving a predetermined space therebetween. In this embodiment, the deflecting plate 16 is substantially a disc member having a downwardly curved peripheral edge 17 and leg portions 18 which mount the disc to the box structure. The deflecting plate 16 may of course be mounted to the box structure by any other suitable means.

Figure 5:
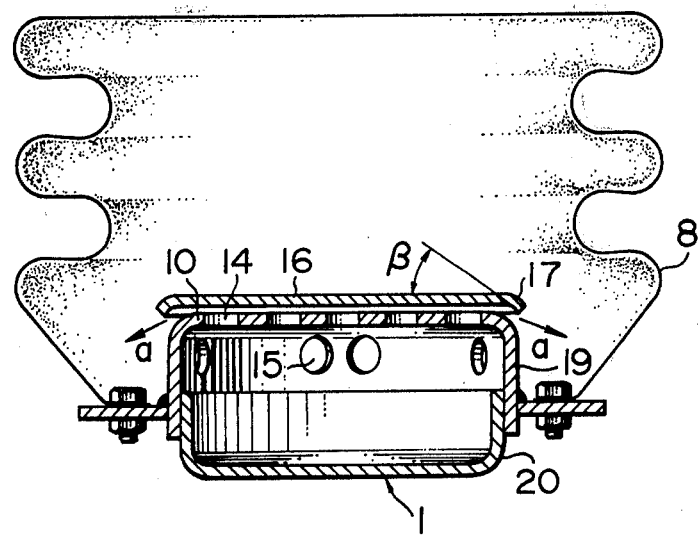

FIG. 5 shows a slight modification of the air-bag means shown in FIGS. 3 and 4 in its operating condition, wherein the air-bag is being inflated. The air-bag means shown in FIG. 5 has substantially the same structure as that shown in FIG. 4, except that the flat end portion 10 and an upper part of the cylindrical side wall portion 11 is merged to present a cup member 19, while the end portion 12 and a lower part of the cylindrical side wall portion 11 is merged to present another cup member 20, these two cup members being engaged with each other to form a cylindrical box. When gas generating chemical substances are reacted in the box to generate high pressure gas, the gas is principally ejected through the gas ejecting openings 14 provided at the upper end portion of the cylindrical box and is deflected by the deflecting plate 16 to be ejected in the direction shown by arrow $a$. The gas ejecting direction $a$ can be optionally controlled by properly altering the curving angle $\beta$ of the peripheral edge portion 17 of the deflecting plate 16. In a preferred embodiment, the direction $a$ may be determined so that the composite reaction force exerted by the gas to the box structure and the deflecting plate is substantially zero. However, when the deflecting plate 16 is positioned reatively close to the flat end portion 10, the angle $\beta$ may be zero, since in this case the reaction force which is exerted to the box structure by the gas jets ejected from the openings 14 is substantially equal to the reaction force which said gas jets exerts to the deflecting plate by impinging thereupon. In this connection, the reaction force which the inflating air-bag exerts to its mounting position, i.e. the box structure may be omitted, since it is relatively small and, furthermore, is not exerted simultaneously with the aforementioned two reaction forces. In the embodiment shown in FIG. 5, the reaction force of the gas jets ejected from the gas ejecting openings 15 balances by itself and does not exert any force to the gas generating means 1.

Figure 1:
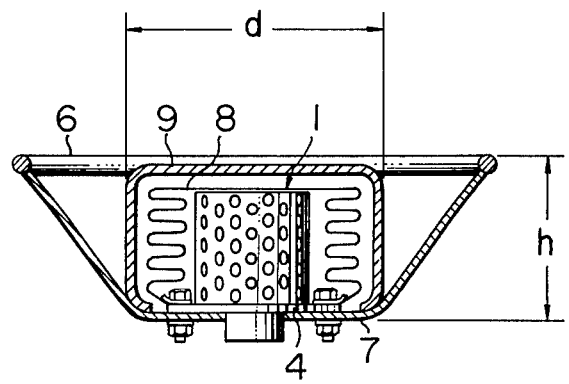
FIG. 1 is a schemmatical sectional view showing an example of the conventional air-bag means mounted to a steering wheel.
Figure 2:
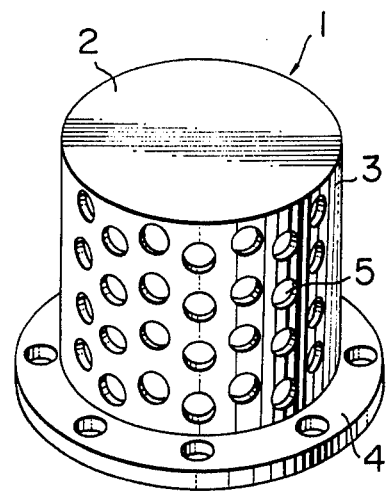
FIG. 2 is a perspective view showing a gas generating means incorporated in the air-bag means shown in FIG. 1.

From the foregoing, it will be appreciated that a compact air-bag means if obtained by the present invention, as will be apparent from a comparison of the steering wheel height $h$ and diameter $d$ of the air-bag means in a stored condition indicated in FIGS. 1 and 3.

I claim:

1. A bufferng air-bag means comprising a gas generating means having a completely hollow outer shell box which is mounted to the hub of a steering wheel, said outer shell box being formed of two substantially U-shaped cup members, the open ends of said cup members engaging with each other so that the open ends thereof close on each other to form a closed, substantially flat bottom wall, a cylindrical perforated sidewall and a perforated, substantially flat top wall, an air bag folded around said outer shell box and adapted to be inflated by gas generated by said gas generating means, and a deflecting plate spaced apart from said top wall of said outer shell box, said deflecting plate having a substantially flat, disc-shaped body which is provided with a plurality of leg portions spaced along the peripheral edge of said disc body, said leg portions being firmly connected to the upper peripheral edge portions of said cylindrical outer shell box so as to hold the substantially flat disc-shaped body relative to said outer shell box in spaced-apart relationship.

2. A buffering air-bag means comprising a gas generating means having a completely hollow outer shell box which is mounted to a hub of a steering wheel, said outer shell box having a relatively short cylindrical body with a closed, substantially flat bottom wall, a perforated cylindrical sidewall and a perforated, substantially flat top wall, an air bag folded around said outer shell box and adapted to be inflated by gas generated by said gas generating means, and a deflecting plate spaced apart from said top wall of said outer shell box, said deflecting plate having a substantially flat, disc-shaped body which is provided with a plurality of leg portions spaced along the peripheral edge of said disc body, said leg portions being firmly connected to the upper peripheral edge portions of said cylindrical outer shell box so as to hold the substantially flat disc-shaped body relative to said outer shell box in said spaced-apart relationship.

* * * * *